United States Patent [19]
Bricker et al.

[11] 3,759,129
[45] Sept. 18, 1973

[54] POWER UNIT

[75] Inventors: Melvin E. Bricker; Thomas E. Dugle, both of Cincinnati, Ohio

[73] Assignee: Bricker Products, Inc., Cincinnati, Ohio

[22] Filed: May 4, 1972

[21] Appl. No.: 250,211

[52] U.S. Cl.................... 83/444, 83/592, 83/571, 83/698, 308/184
[51] Int. Cl............................ B26d 7/26, B26d 4/22
[58] Field of Search...................... 83/444, 698, 355, 83/356, 594, 571, 591, 481, 592; 308/184 R

[56] References Cited
UNITED STATES PATENTS
2,857,974 10/1958 Heller .......................... 308/184 R X
3,066,714 12/1962 Qualheim.............................. 83/592

FOREIGN PATENTS OR APPLICATIONS
805,085 11/1958 Great Britain........................ 83/355

*Primary Examiner*—Willie G. Abercrombie
*Attorney*—James S. Hight et al.

[57] ABSTRACT

An improved power unit for driving vegetable cutting attachments comprises a housing, a motor mounted within the housing, an attachment supporting hub mounted on the front of the housing and a drive for connecting the motor to a shaft extension of the attachment. The drive includes a drive sleeve mounted for rotation and radial displacement in the hub, a sprocket attached to the rear of the sleeve and a resilient bracket for universally and rotatably supporting the rear end of the sleeve. The shaft extension of the vegetable cutter extends a relatively short distance into the front end of the drive sleeve to provide, in combination with the radial displacement of the sleeve and with the resilient rear bracket, a universal driving connection therebetween. A tensioner is provided to tension a chain connecting the sprocket attached to the sleeve and a sprocket on a motor output shaft. The drive components are releasably secured together to facilitate unskilled disassembly for repair.

12 Claims, 5 Drawing Figures

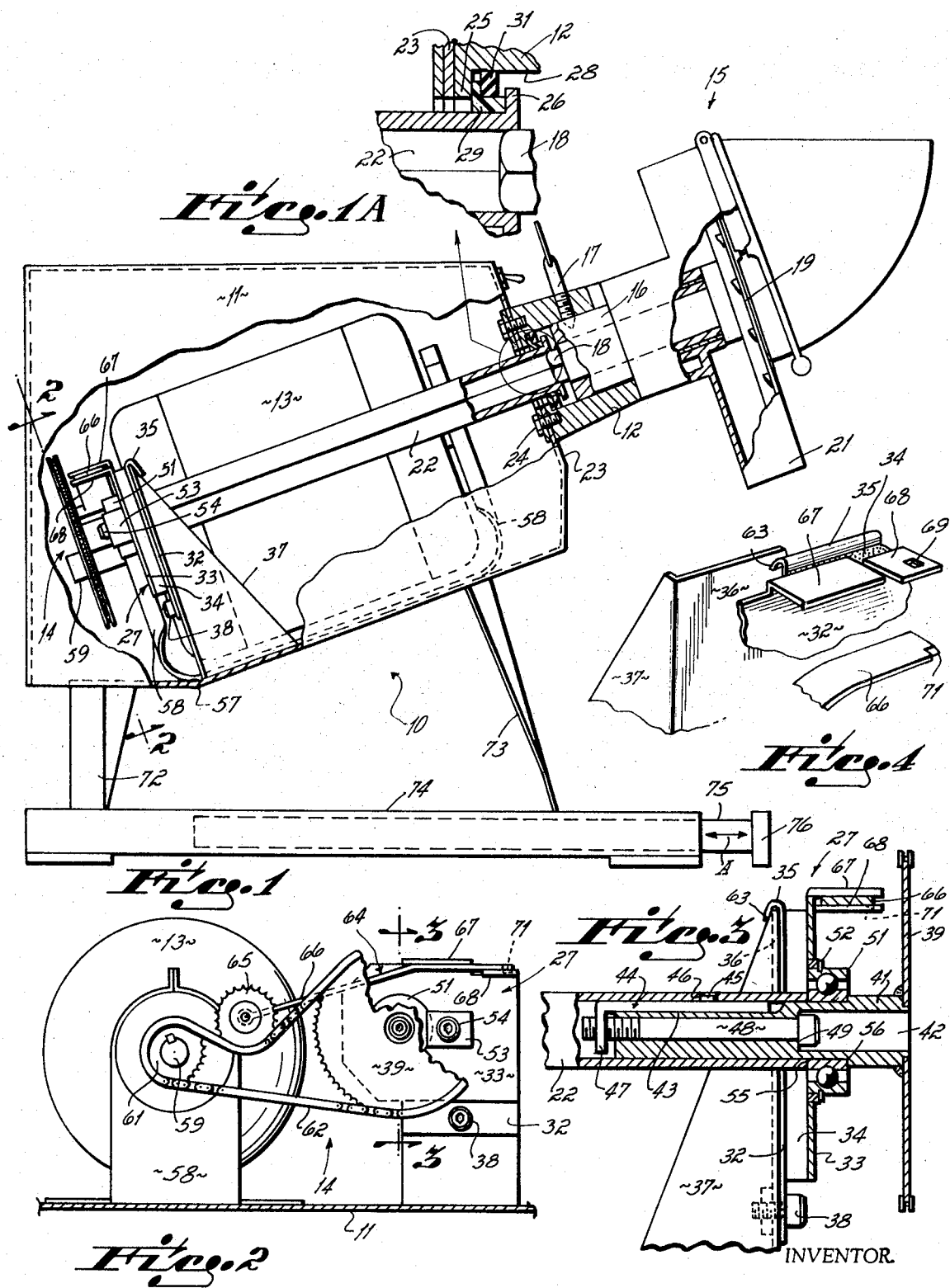

POWER UNIT

The invention relates generally to power units for food cutters and is particularly directed to a high-speed drive for vegetable cutters, such as cabbage shredders, utilized in restaurants, carryout food stores and other establishments which prepare food in large quantities.

A power unit somewhat similar to that of the present invention is disclosed in my earlier U.S. Pat. No. 3,563,290. While this prior unit has proven to be efficient for driving various food processing attachments such as the one shown in my earlier U.S. Pat. No. 3,416,583, the power unit of the present invention provides an improved drive apparatus for transferring power from a motor to the drive shaft of the appropriate food processing attachment.

One problem with prior power units is that of alignment between the drive shaft of the cutter attachment and the driving element of the power unit. Where the drive shaft and driving element are rigidly held in their respective units, and the connecting surfaces of the typical connecting hub of the power unit and the sleeve housing of the cutter are not made and assembled to rigid specifications, alignment of the shaft and driving element may present assembly and operating problems including binding between the components involved. It can be appreciated that this alignment becomes severely critical when the drive element of the power unit is extended to the rear of the housing and is journalled both at the front and the rear of the housing.

When some repair or adjustment has been necessary to the drive of the prior power unit, it has generally been necessary to gain access to the front portion of the housing, where various elements of the drive were located, from the rear of the unit. Not only was this awkward, but in some cases resulted in requiring skilled help to repair breakdown or malfunctions. thereby increasing "down" time while the device was inoperative. When a chain drive was utilized in the power unit, it resulted frequently in increased noise and vibrations.

One objective of the invention has been to provide a power unit with an improved drive which is simply and inexpensively manufactured and yet which operates with a minimum of noise and vibration, is easily dismantled for repair by unskilled persons, and is self-aligning to facilitate re-assembly and operation.

The present invention contemplates a relatively small, integral power unit complete with a motor, an improved speed reducing drive apparatus, a hub for supporting a vegatable cutter attachment and apparatus establishing a universal driving connection to the drive shaft extension of a rotary cutter disc thereof. To this end, the speed reducing drive includes a sprocket mounted on a rearwardly extending motor shaft. A drive sleeve is rotatably mounted between the front hub and a resilient rear mounting bracket and a driven sprocket is secured to a shaft, releasably held within the rear end of the drive sleeve. The shaft is journalled in the rear bracket which provides a resilient mount on the power unit to enhance the smoothness and quietness of the operation and to provide for universal movement of the rear end of the device sleeve to further effect a universal connection as will be described. A chain is positioned between the motor sprocket and the driven sprocket to impart rotational force thereto.

The drive sleeve extends through the front portion of the housing and through a bore in the hub, the bore being slightly larger than the sleeve and a flange provided about the sleeve. A resilient ring is provided between the walls of the bore and the sleeve to allow the end of the sleeve to be radially displaced. An extension of the cutter drive shaft extends a short distance into the sleeve when a vegetable cutter or the like is mounted on the power unit, in order to transfer motion from the drive sleeve to the cutter plate, for example. The combination of the radially displaceable end of the drive sleeve and the short engagement of the shaft extension within the sleeve together with the universally mounted rear end of the sleeve results in a universal connection between the sleeve and the extension.

A chain tensioner comprises a sprocket rotatably mounted on a leaf spring which is releasably held between supporting surfaces on the resilient rear mounting bracket. When in operative position, the tensioner serves to impart a tensioning force on the chain. The tensioer may be easily manipulated out of operative position so that the chain and, in addition, all the drive components, may be easily removed for replacement, adjustment, or repair.

One advantage of my improved power unit is that it can be simply and inexpensively constructed of relatively few parts and can be readily disassembled for reapir by unskilled persons so as to minimize "down" time in the field.

Another highly important advantage of my improved power unit is that it effects a universal driving connection between the driving components of the unit and the drive shaft extension of the food processing attachments connected thereto so as to accommodate axial misalignment therebetween and to facilitate re-assembly and operation.

A further advantage of my improved power unit is that is operates with a minimum of noise and vibration.

These and other objects and advantages of the invention will be better ubderstood from a description of a preferred embodiment and from the drawings, in which:

FIG. 1 is a general view of the power unit showing an attached vegetable cutter, a drive sleeve, and the connection between the drive sleeve and the attached cutter, FIG. 1A is an enlarged fragmentary view of the encircled area of FIG. 1, FIG. 2 is a rear view showing the chain tensioner, the drive sleeve sprocket, and the rear mounting bracket, FIG. 3 is a view taken along lines 3—3 of FIG. 2 showing the details of connection between the drive sleeve, its sprocket and the rear mounting bracket, and FIG. 4 is a view of the rear monting bracket and the supporting surfaces for the chain tensioner.

Referring to FIGS. 1 and 1A, the power unit of my invention is indicated at 10. It includes a housing 11, a hub 12 mounted on the forward portion of the housing 11, a motor 13, and a speed reducing drive 14 as will be described. A vegetable cutter attachment 15 is shown attached to hub 12 of the unit 10. One form of such attachment is shown in my previous U.S. Pat. No. 3,416,583. An attachment sleeve 16 extends from the cutter 15 into the hub 12 and is locked in position by a wing screw of bolt 17. A cutter supporting and rotation shaft with a square extension 18 is rotatably supported in the attachment sleeve 16 for transmitting rotary motion to a cutter head or plate 19. One typical form of cutter particularly useful for shredding cabbage and the like is shown in my copending application Ser. No. 875,805, filed Nov. 12, 1969, for a "Shredder Plate". The comminuted material, for example shredded cabbage, is discharged from the cutter attachment through a discharge chute 21. The driven shaft extension 18 has a chamfered end to ease its insertion into a driving element of the power unit comprising a drive sleeve 22 and the extension 18 extends into the sleeve 22 a distance approximately equal to the width of the square side of the shaft extension itself. The hub 12 and the sleeve 22 may be provided in different sizes to accept a variety of vegetable cutters of different makes and attachments for different functions.

The hub 12 is secured to a front wall 23 of the power unit housing 11 by way of bolts 24. The hub 12 includes an inwardly extending annular flange 25 which cooperates indirectly with a circular flange 26 provided on drive sleeve 22 to inhibit motion of the drive sleeve 22 in a rearward direction. The drive sleeve 22 extends in a generally rearward direction toward a rear mounting bracket 27.

It will be noted that the bore defined by inwardly extending flange 25 of the hub 12 is larger than drive sleeve 22 and that a bore 28 of the hub is larger than flange 26. Supporting the sleeve 22 for rotation in the bore 28 is a self-lubricating ring 29 and a rubber washer 31 surrounding and placed on ring 29. The outer surface of washer 31 engages the bore 28 of the hub 12 while the inner surface of self-lubricating ring 29 engages the drive sleeve 22. The resilience of the washer 31 allows the forward end of drive sleeve 22 to be radially displaced to some degree and yet supports the sleeve for rotation within the hub. when a vegetable cutter 15 or the like is connected to the hub 12, the drive sleeve may be radially positioned to align with the driven shaft extension 18 of the cutter. Since washer 31 is resilient, the sleeve is aligned throughout the operation of the unit as can be appreciated.

The relatively short extension of shaft 18 into the sleeve 22 as previously stated, and the chamfered end of the extension 18 together with the radial displacing feature of the forward end of the drive sleeve and with the to be described universal rear mount of the drive sleeve results in a "universal" type connection between the drive sleeve 22 and the driven shaft extension 18. This "universal" connection negates the necessity of close manufacturing tolerances with respect to the hub 12, the drive sleeve 22, and the connecting surfaces of the cutter 15.

The rear mounting bracket 27 includes a first or front plate 32 and a second or rear plate 33. A resilient composition 34 such as rubber or any suitable compound is adhered by any suitable adhesive to plates 32 and 33 so as to resiliently bind them together. The plate 32 has a bent or hook portion 35 which is shaped to support the bracket 27 over a bracket or support 36 of the housing 11. A bolt 38 extends through a bottom portion of the plate 32 to secure it to the bracket 27.

The support bracket 36 is welded or otherwise attached to the bottom of housing 11 and may have a reinforcing flange 37 also welded to the housing at its bottom. The other side of the support bracket 36 is not welded to the housing, and consequently the bracket itself is slightly yieldable to allow some movement of bracket 27, should it be necessary for assembly or alignment of the drive.

A first rotatable means or sprocket is mounted on a driving element which comprises a sprocket or driving shaft 41, this shaft being provided with a bore 42. The sprocket shaft 41 may be rod-like but it has a flat milled portion 43.

A bracket 44 is located within drive sleeve 22 and is secured against axial movement by the cooperation of a button or deformed portion 45 on the bracket and hold 46 in the sleeve 22. The bracket 44 has a depending ear of flange member 46 which is threaded to cooperate with bolt 48. This bolt has its head located on a seat 49 of the bore 42 and extends through the shaft 41 to ear 47 of bracket 44 in order to secure the shaft 41 to the sleeve 22.

In this manner, the sprocket is releasably secured to the drive sleeve 22 and it can be appreciated that, if bolt 48 is withdrawn from ear 47, the sprocket shaft 41 may be pulled from sleeve 22 and sleeve 22 may be removed from the unit 10 by pushing it forwardly of the hub 12.

The sprocket shaft 41 is journalled for rotation in a bearing 51 mounted in a bore through plate 33 of the rear mounting bracket by means of a snap-ring 52. A clip 53 is bolted by bolt 54 to hold the bearing 51 in place. The inner race of bearing 51 is ecurely held between the end 55 of sleeve 22 and the annular seat 56 on the sprocket shaft 41.

Since the sprocket shaft 41 is journalled in the rear plate 33 and since the plate 33 is only resiliently secured to the front plate 32, the shaft 41 and the associated sprocket 39 are cushioned by the resilient composition 34. Such a mounting results in a universal support for the rear end of the drive sleeve and shaft assembly. In addition the resilient bracket substantially reduces oeprating noise and vibration. Also, since the side of the support bracket 36 is not welded to the housing of the power unit, no vibrations are transferred to this portion of the housing and any stress placed on the support 36 will not tend to deform the side of the housing but will be borne by the bottom portion of the housing which is stronger due to an adjacent bend at 57.

It should be noted that, while the preferred embodiment discloses the details of the sprocket 39 and driving shaft 41, the apparatus may be constructed by extending sleeve 22 through the rear bracket 29 and an appropriate bearing and by securing the sprocket 39 directly to the sleeve near its rear end. Due to the resilience of bracket 27, the rear end of sleeve 22 would still be universally mounted.

The motor 13 is mounted within housing 11 by any suitable means such as by resilient mounts 58. The motor has a rearwardly extending output or drive shaft 59 on which is connected a second rotatable means or motor sprocket 61. A flexible connecting means such as a chain 62 is positioned about the sprockets 39 and 61 for transferring rotary motion from the motor sprocket 61 to sprocket 39. A belt and pulleys or any flexible means connecting associated rotatable means may be used to connect the motor to the drive sleeve, in place of the chain ad sprockets described.

It will be noted that an end 63 of bent portion 35 of the bracket plate 32 engages the top of side flange 37 of bracket support 36 so as to limit lateral movement of the bracket 27 in a direction toward the motor 13 when a load is transferred to the bracket by the chain 62. The combination of this engagement with the bolt 38 maintains the bracket 27 against lateral movement (other than that allowed by resilient composition 34), yet the bracket 27 is readily removed merely by the unthreading of bolt 38 and by an upwardly motion to clear the bent portion 35 from the bracket 36.

A chain tensioner 64 is generally shown in FIG. 2 and its support in FIGS. 3 and 4. The tensioner comprises a sprocket 65 rotatably mounted on a leaf spring 66. The spring 66 is pre-shaped such that it urges the sprocket 65 in a downwardly direction when it is held in correct operative position.

The spring 66 is releasably mounted on plate 33 of bracket 27 by supporting surfaces including an upper flange 67 and a lower flange 68. The lower flange 68 has a hole 69 which is shaped to receive a lug 71 provided on the leaf spring.

When the tensioner 64 is in operative position, the sprocket 65 is positioned on the chain 62, and the leaf 66 is stressed upwardly against its supporting flange 67, and downwardly against its supporting flange 68 so that the lug 71 is held in the hole 69 and such that the tensioner 64 is secured against any undesired movement. Since the leaf 66 of the tensioner is mounted on the cushioned plate 33, its vibrations and noise are substantially reduced as are the vibrations from sprocket shaft 41.

For removing the chain 62, the leaf 66 may be lifted against its bias by hand, and the chain removed from the sprockets 39 and 61. The leaf 66 may then be moved downwardly and removed from the unit 10, as can be appreciated. To install a new chain it is ony necessary that the leaf 66 be inserted between the flanges 67 and 68 and raised against its bias so that a chain 62 may be fitted about the sprockets. The sprocket 65 is then lowered onto the chain to tension it. Starting and stopping stresses on the chain 62 are somewhat relieved by the resilient mounting of the motor and of the sprocket 39 and by the slightly yieldable nature of the bracket 27.

If it is desired to disassemble the complete drive, once the chain and tensioner are removed, the bolt 48 may be removed and then sprocket 39 with the sprocket shaft 41 can be removed in a rearward direction. The drive sleeve 22 is then removed forwardly through the hub 12. Bolt 38 is removed and the rear bracket 27 lifted from the support bracket 36. Bolts 38, 48 and 54 may have the same Allen-head size so as to require only one wrench for removal thereof and to facilitate take-down. Reassembly of the drive is self evident and is facilitated by the nature of the resilient fit of the front end of the drive sleeve 22 in the hub 12 and by the slightly yieldable rear support bracket 26 as well as the resilient connection betwee the front and rear plates 32 and 33 of the bracket 27.

The housing 11 is supported by two rear legs 72 and by two front legs 73. The legs are welded to bottom members 74, the front legs being welded perpendicular to the bottom members 74 and then bent to the angle shown so as to eliminate any pockets about the joint which are difficult to clean. Legs 75 are provided within the members 74 and may be extended or retracted in the direction of arrow "A" for storage. Extension of the legs 75 increases the stability of the unit 10 as well as provides supports for a food receiving tray (not shown) to be placed beneath the chute 21 of vegetable cutter attachment 15. The legs 75 have pads 76 on the ends thereof for supporting the ends of the legs or for providing stops for a tray placed on the legs beneath the chute 21 through which processed food is discharged.

It will be noted that the two front legs 73 support the front of the housing 11 at a greater height with respect to the horizontal than the back portion of the housing in the manner shown in my previous U.S. Pat. No. 3,563,290. This has the effect of elevating the drive axis of the hub 12 and drive sleeve 22 at an appreciable angle, for example of from 15° to 20°. This construction has the advantage of increased stability, it facilitates the gravity feed of the vegetable cuter thereby reducing operating time and elevates the cutter above the unit's supporting surface to provide a convenient space for the insertion of a food receiving container beneath the cutter's discharge chute.

It can be readily appreciated that the disclosed power unit is very serviceable and efficient, and has substantial reductions in noise and vibrations. The components are very easily and inexpensively manufactured and require no precise fitting or machinery, yet they are self-aligning to produce a very efficient and positive drive.

Furthermore, it can be appreciated that the components may be completely disassembled or assembled by one of relatively little skill in the art for the purpose of repair and replacement. This decreases machine "down" time since spare parts may be kept on hand and immediately placed into use to replace defective or worn parts.

The placement of the elements of the drive in the rear of the unit 10 greatly aids in ready access to them and enables the housing to be attractively made as an integral piece with only a removable or hinged back panel.

The power unit of the present invention incorporates all the advantages of the previous unit shown in my earlier U.S. Pat. No. 3,563,290.

While I have described my invention in detail, other modifications and advantages will become readily apparent to those of ordinary skill in the art and I intend to be bound only by the appended claims.

I claim:

1. A power unit for driving a vegetable cutter attachment having a hopper, a high speed cutter, a drive shaft for supporting and rotating the cutter and including a shaft extension for connection to the power unit, said power unit comprising:

a housing a motor mounted within said housing and including an output shaft;

an attachment supporting hub mounted on the housing, an elongated drive sleeve adapted for connection to said shaft extension at said hub and extending rearwardly from said hub, means for effecting a universal driving connection between said drive sleeve and said shaft extension to accommodate axial misalignment between said sleeve and said extension, said means including means rotatably and universally mounting said sleeve near its rear end and in proximity to a rear portion of the housing and means supporting said sleeve in said hub for rotational and radial motion, and means for connecting said motor output shaft to said drive sleeve to effect a driving connection between said output shaft and said sleeve.

2. A power unit as in claim 1 wherein said universal connection further includes a relatively short engagement between said drive sleeve and said shaft extension.

3. A power unit as in claim 2 wherein an end of said attachment drive shaft extension is generally square in cross section and is chamfered and wherein it extends into and engages said drive sleeve a distance approximately equal to the width of its square cross section so as to effect the universal connection between said drive sleeve and said attachment drive shaft.

4. A power unit as in claim 1 wherein said means rotatably and pivotally mounting said drive sleeve includes a support and a rear mounting bracket which comprises:
   a first plate,
   means for relasably attaching said first plate to the support,
   a second plate provided with a bearing means for supporting said sleeve for rotation, and
   resilient means adhered to the first and second plates to resiliently connect said plates together.

5. A power unit as in claim 1 wheein said means for connecting the motor output shaft to the drive sleeve includes a first rotatable means secured to said drive sleeve near its rear end, a second rotatable means secured to the output shaft of said motor, and flexible means operatively connecting said first and second rotatable means.

6. A power unit as in claim 5 wherein said first rotatable means is operatively mounted on a driving shaft journalled in a rear mounting bracket and wherein said driving shaft extends forwardly of said bracket and into said drive sleeve, said driving shaft cooperating with said drive sleeve to support it and impart rotary motion thereto.

7. A power unit as in claim 6 wherein a fastening means extends through said driving shaft and into a non-yielding member in said sleeve for releasably securing said first rotatable means and said driving shaft to said sleeve.

8. A power unit as in claim 6 wherein said rear mounting bracket comprises:
   a first plate with a flanged top portion for cooperation with a support,
   fastening means in a lower portion of said first plate for attaching the first plate and the support together,
   a second plate provided with a bore for the driving shaft, and
   a resilient means positioned between said first and second plates and adhered thereto for resiliently securing said plates together.

9. A power unit as in claim 5 wherein a tensioning means is positioned to tension said flexible means and wherein said tensioning means include:
   a third rotatable means for directly engaging said flexible means, said third rotatable means being mounted on a leaf spring, and
   said leaf spring being releasably held by cooperating surfaces on a mounting bracket.

10. A power unit as in claim 9 wherein said mounting bracket includes a first plate releasably secured to a support, and a second plate resiliently secured to the first plate, said cooperating surfaces being located on said second plate and including upper and lower flange means for releasably supporting said leaf spring in a position to urge said rotatable means into tensioning contact with said flexible means.

11. A power unit as in claim 9 wherein said first, second and third rotatable means comprise sprockets, and wherein said flexible means is a chain.

12. A power unit as in claim 1 including means supporting said housing at an angle relative to the horizontal with a front wall of the housing being elevated.

* * * * *